United States Patent [19]
Liu

[11] Patent Number: 5,897,020
[45] Date of Patent: Apr. 27, 1999

[54] FOOD CONTAINER WITH LADLE HOLDING STRUCTURE

[76] Inventor: Shu Lien Liu, 2FL., 33, Lane 52, Szu-Wei Road, Taipei, Taiwan

[21] Appl. No.: 09/096,357

[22] Filed: Jun. 12, 1998

Related U.S. Application Data

[63] Continuation-in-part of application No. 08/791,646, Nov. 25, 1996, abandoned.

[30] Foreign Application Priority Data

Nov. 29, 1995 [CN] China .................................. 95227270

[51] Int. Cl.⁶ .................................................. A47J 36/16
[52] U.S. Cl. ...................... 220/735; 220/912; 220/573.1
[58] Field of Search .................................. 220/735, 912, 220/573.1, 573.4, 574, 574.1

[56] References Cited

U.S. PATENT DOCUMENTS

| 341,621 | 5/1886 | Zanetti | 220/735 |
|---|---|---|---|
| 820,062 | 5/1906 | Mottlau | 220/735 |
| 1,393,574 | 10/1921 | Rohmiller | 220/735 |
| 3,955,742 | 5/1976 | Marshall et al. | 220/735 |

FOREIGN PATENT DOCUMENTS

| 13702 | of 1929 | Australia | 220/735 |
|---|---|---|---|
| 560757 | 4/1960 | Belgium | 220/735 |
| 249792 | 4/1926 | United Kingdom | 220/735 |

*Primary Examiner*—Stephen Castellano
*Attorney, Agent, or Firm*—Dougherty & Troxell

[57] ABSTRACT

The food container has a top edge formed with a slot. The slot allows a ladle having a hooked rear end to be hung thereto when the ladle is placed on the inside of the food container, thereby preventing the ladle from dipping into the stew in the food container.

2 Claims, 2 Drawing Sheets

5,897,020

FOOD CONTAINER WITH LADLE HOLDING STRUCTURE

This application is a continuation-in-part (CIP) of U.S. patent application Ser. No. 08/791,646 filed on Nov. 25, 1996 now abandoned.

BACKGROUND OF THE INVENTION

1. Field of the Invention

This invention relates to a food container which is provided with a ladle holding structure that can hold a ladle firmly in position inside the food container.

2. Description of Related Art

Pots are a kitchen utensil used to cook stews or soups. A pot is usually used with a ladle, which is a long-handled spoon with a deep bowl-like front end, for conveying the stew or soup in the pot into a dish for serving to the diner. By careless handling, a short-handled ladle might fall out of hand and dip into the stew. Since the handle is usually held by hand, the ladle submerged in the stew could cause contamination to the stew.

These problems of the conventional stew pot will be depicted illustratively in the following with reference to FIGS. 1 and 2.

FIGS. 1 and 2 show a conventional stew pot which has the disadvantages mentioned above. This stew pot includes a container 1 for containing the stew and a lid 5 for covering on the top of the container 1. On the top edge of the container 1, a groove 2 is formned circumferentially on the top edge of the container 1 for receiving the edge of the lid 5 when the lid 5 covers on the top of the container 1. A ladle 4 is used to convey the stew in the container 1 to, for example, a bowl for serving the stew to the diner.

If the ladle 4 has a short handle, as illustrated in FIG. 1, the ladle 4 would usually slip and thus dip into the stew after the diner puts the ladle 4 back into the container 1. It is very inconvenient to get the ladle 4 out of the stew and use it again for making servings.

On the other hand, if the ladle 4 has a long handle, as illustrated in FIG. 2, the rear part of the ladle 4 will be exposed to the outside of the container 1 when the bowl part of the ladle 4 is placed on the inside of the container 1. This will cause the lid 5 unable to cover the container 1 tightly, such that houseflies, dust, or any foreign objects could gain access to the stew.

SUMMARY OF THE INVENTION

It is therefore a primary objective of the present invention to provide a food container with a ladle holding structure for holding a ladle firmly in position on the inside of the food container without letting the ladle to dip into the stew or soup contained in the food container.

It is still another objective of the present invention to provide a food container with a ladle holding structure which allows the ladle to be placed on the inside of the food container when temporarily not in use, so that no other utensils are needed to hold the ladle.

Accordingly the present invention provides a food container with a lid and a ladle, which ladle has a handle in the form of the hook at one end and a bowl at the other end, the container comprising a bottom and circumferential side wall, and the lid being adapted to fit on a circumferential groove in an upper side of an outer circumferential ring of said side wall, characterized in that said side wall further includes a slot to receive said hook, which slot being located at an inner circumferential region of said side wall below said groove, and the ladle being such that it can be retained wholly within the container while hanging by said hook from the slot and with the bowl either resting on the inner side wall of the container or on the bottom of the container.

BRIEF DESCRIPTION OF DRAWINGS

The invention can be more fully understood by reading the following detailed description of the preferred embodiments, with reference made to the accompanying drawings, wherein.

DETAILED DESCRIPTION OF PREFERRED EMBODIMENT

Figure 1:
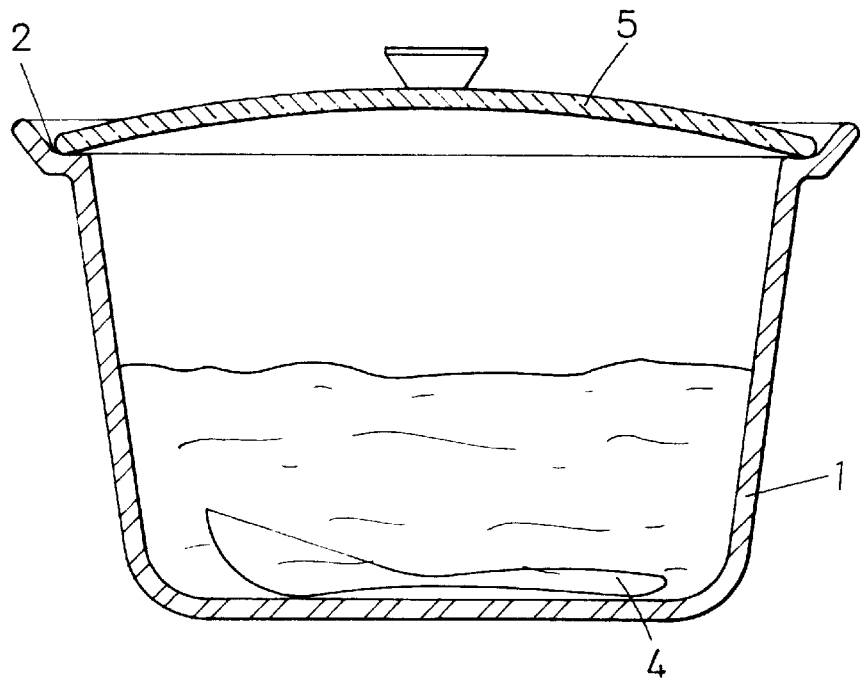
FIG. 1 is a schematic sectional diagram of a conventional pot with a short-handled ladle which falls into the stew.
Figure 2:
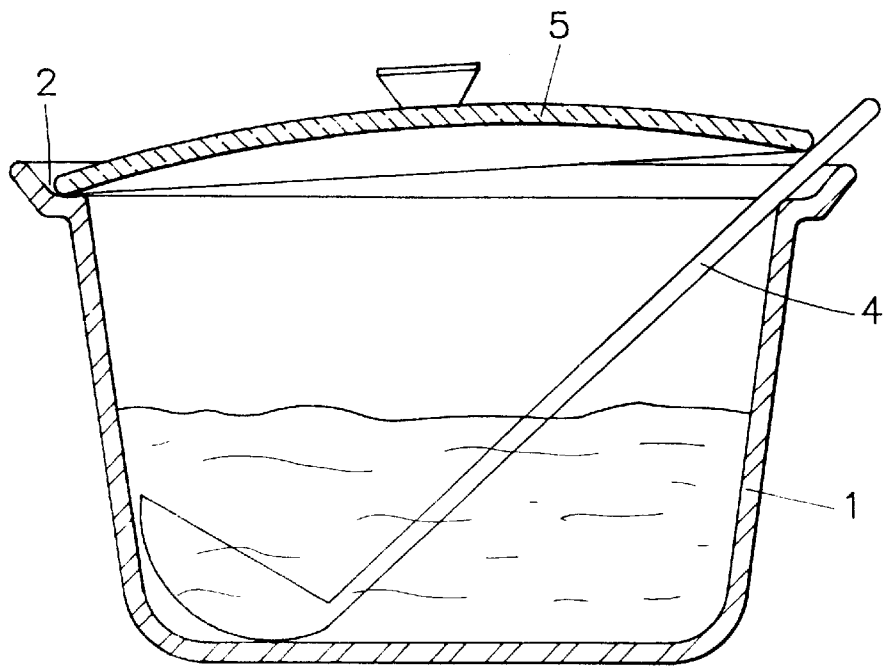
FIG. 2 is a schematic sectional diagram of a conventional pot with a long-handled ladle having a lengthy handle that protruded to the outside of the pot when the ladle is placed in the pot.
Figure 3:
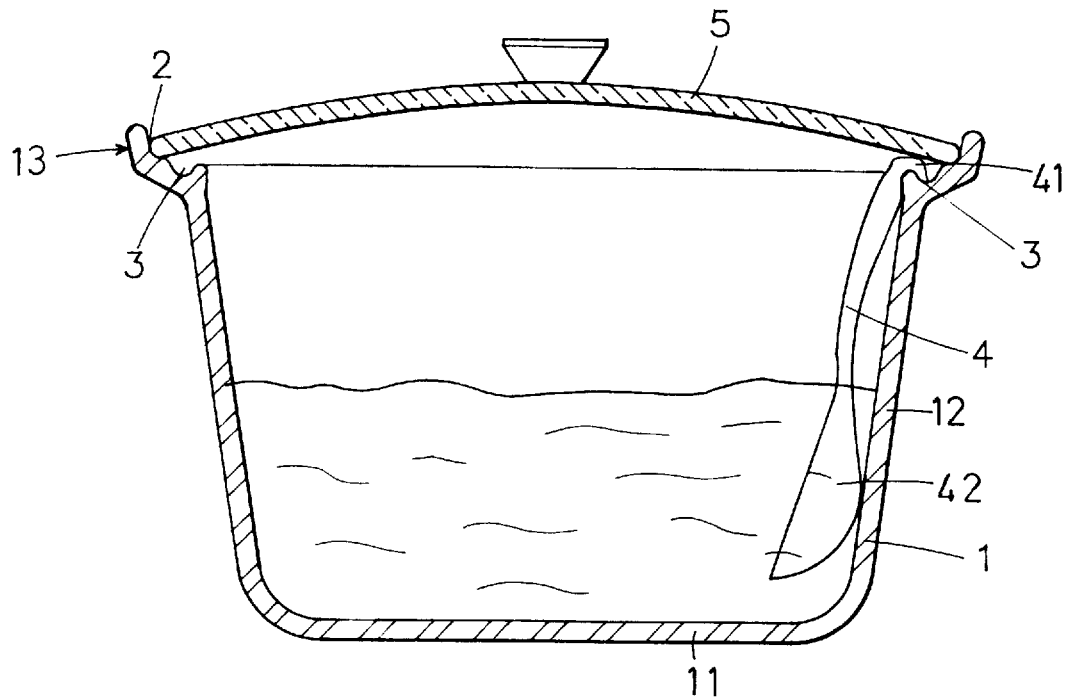
FIG. 3 is a schematic sectional diagram of a food container with a ladle holding structure according to the present invention when holding a short-handled ladle.
Figure 4:
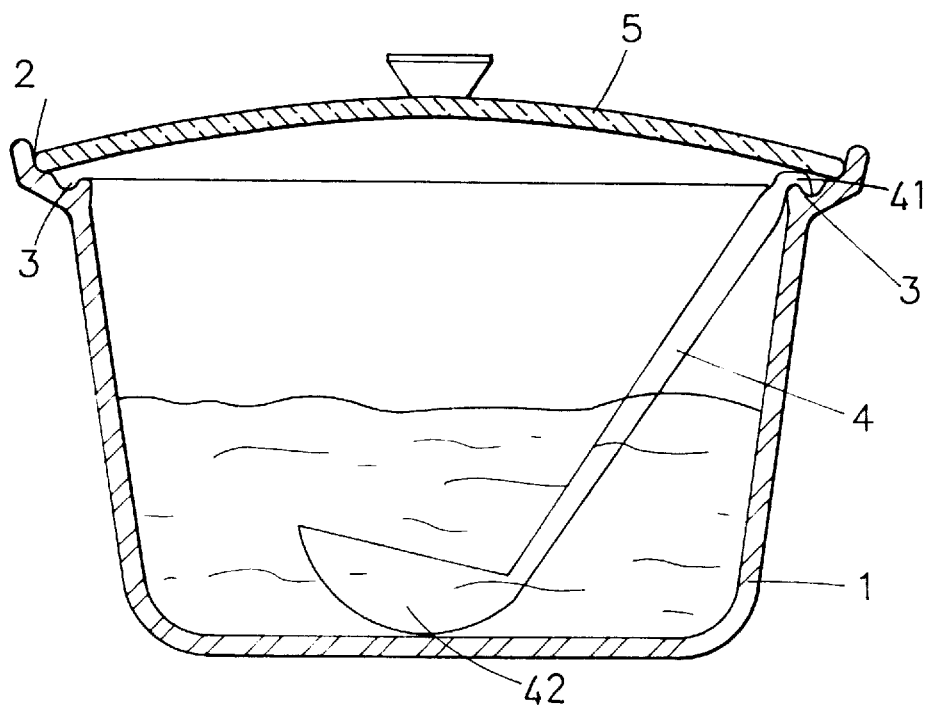
FIG. 4 is a schematic sectional diagram of a food container with a ladle holding structure according to the present invention when holding a long-handled ladle.

Referring to FIG. 3, there is shown a schematic sectional diagram of a food container, such as a stew pot, with a ladle holding structure according to the present invention. The stew pot includes a container 1 for containing the stew comprising a bottom 11 and a circumferential side wall 12, and a lid 5 for covering the top of the container 1. A ladle 4 is used to convey the stew in the container 1 to, for example, a bowl for making a serving of the stew to the diner. On the top edge 13 of the container 1, a circumferential groove 2 is formed in an upper side of an outer circumferential ring 13 of said side wall 12 of the container 1 for receiving the edge of the lid 5 when the lid 5 covers on the top of the container 1. Further, a slot 3 is further formed and located at an inner circumferential region of said side wall 12 of the container 1 below the groove 2. The ladle 4 has the rear end of its handle formed with a hooked portion 41 which allows the ladle 4 to be hung to the slot 3 when the ladle 4 is temporarily not in use. For a ladle with a short handle, the slot 3 allows the ladle to be hung down and rest on the inner wall of the container 1, as illustrated in FIG. 3; for a ladle with a long handle, the slot 3 allows the rear end of the ladle to be securely held thereby, such that the ladle would not have its rear end dip into the stew, as illustrated in FIG. 4. Since the slot 3 is formed below the groove 2, the slot 3 is within the closed inside of the container 1 when the lid 5 covers on the top of the container 1. Thus, the ladle 4 can still be held in position when the lid 5 covers on the top of the container 1. Accordingly the present invention provides a food container 1 with a lid 5 and a ladle 4, which ladle 4 has a handle in the form of the hook at one end and a bowl at the other end, the container 1 comprising a bottom 11 and circumferential side wall 12, and the lid 5 being adapted to fit on a circumferential groove 2 in an upper side of an outer circumferential ring 13 of said side wall 12, characterized in that said side wall 12 further includes a slot 3 to receive said hook 41, which slot 3 being located at an inner circumferential region of said side wall 12 below said groove 2, and the ladle 4 being such that it can be retained wholly within the container while hanging by said hook 41 from the slot 3 and with the bowl 42 either resting on the inner side wall of the container 1 or on the bottom 11 of the container 1. It is to be understood that the above-mentioned slot 3 can be either formed circumferentially on the top edge of said container 1, or only on a selected section of the top edge of said food container 1.

With the foregoing food container, the ladle can be firmly held in position on the inside of the food container without letting the ladle to dip into the stew or soup contained in the food container. Placed on the inside of the food container, the ladle is always within convenient reach by the diner when he/she wants to make a serving of the stew from the food container. Further, the food container of the invention allows the ladle to be placed on the inside of the food container when temporarily not in use, so that no other utensils are needed to hold the ladle. The table can thus always kept clean.

The invention has been described using exemplary preferred embodiments. However, it is to be understood that the scope of the invention is not limited to the disclosed embodiments. To the contrary, it is intended to cover various modifications and similar arrangements. The scope of the claims, therefore, should be accorded the broadest interpretation so as to encompass all such modifications and similar arrangements.

I claims:

1. A combination of a food container with a lid and a ladle, said ladle having a handle in the form of a hook at one end and a bowl at the other end, the container comprising a bottom and a circumferential side wall, and the fitting upon a circumferential groove in an upper side of an outer circumferential ring of said side wall, characterized in that said side wall further includes a slot receiving said hook, said slot being located at an inner circumferential region of said side wall below said groove, and the ladle being retained wholly within the container while hanging by said hook from the slot.

2. The food container of claim 1, wherein said slot is formed on a selected section of said food container.

* * * * *